(12) United States Patent
Bailenson et al.

(10) Patent No.: US 12,118,179 B2
(45) Date of Patent: *Oct. 15, 2024

(54) INTELLIGENT AUTHORING FOR VIRTUAL REALITY

(71) Applicant: STRIVR Labs, Inc., Santa Clara, CA (US)

(72) Inventors: Jeremy Bailenson, Redwood City, CA (US); Michael Casale, Hermosa Beach, CA (US)

(73) Assignee: STRIVR Labs, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,211

(22) Filed: Nov. 1, 2023

(65) Prior Publication Data

US 2024/0061548 A1    Feb. 22, 2024

Related U.S. Application Data

(63) Continuation of application No. 17/957,799, filed on Sep. 30, 2022, now Pat. No. 11,836,329.

(Continued)

(51) Int. Cl.
*G06F 3/04815* (2022.01)
*G02B 27/01* (2006.01)
*G09B 9/00* (2006.01)

(52) U.S. Cl.
CPC ....... *G06F 3/04815* (2013.01); *G02B 27/017* (2013.01); *G09B 9/00* (2013.01)

(58) Field of Classification Search
CPC .............. G09B 9/00; G09B 7/02; G09B 5/06; G09B 9/003; G09B 5/14; G09B 9/04; G09B 9/05; G09B 19/00; G09B 23/28; G09B 23/285; G09B 25/00; G09B 9/048; G09B 9/301; G06F 16/3344; G06F 16/35; G06F 3/04815; G06F 1/163; G06F 16/3329;

(Continued)

(56) References Cited

U.S. PATENT DOCUMENTS

| | | | |
|---|---|---|---|
| 2019/0073124 A1* | 3/2019 | Li | G06F 3/04886 |
| 2022/0358727 A1* | 11/2022 | Gupta | G06T 19/006 |
| 2024/0075291 A1* | 3/2024 | Lin | A61N 1/36 |

OTHER PUBLICATIONS

Notice of Allowance mailed Jul. 26, 2023 in U.S. Appl. No. 17/957,799, filed Sep. 30, 2022. 9 pages.

* cited by examiner

*Primary Examiner* — Rayeez R Chowdhury
(74) *Attorney, Agent, or Firm* — Kilpatrick Townsend & Stockton LLP

(57) ABSTRACT

Techniques are provided for creating a virtual environment that can be used for virtual trainings. The virtual environment is configured so that the environment can be viewed using a head-mounted display. A computer system can receive a learning objective from a client and the computer system can present the client with a series of question strings about the objective. Based on answer strings received from the client, the computer system can add skill frameworks, interactive frameworks, positional information, and timing information to fields in a training plan table. The computer system can receive visual content from the client or retrieve visual content from a visual content database. Using the training plan table, interactive frameworks can be added to visual content to produce a virtual environment.

20 Claims, 11 Drawing Sheets

Related U.S. Application Data

(60) Provisional application No. 63/252,037, filed on Oct. 4, 2021.

(58) Field of Classification Search
CPC ...... G06F 16/334; G06F 16/93; G06F 3/0482; G06F 16/332; G06F 16/335; G06F 16/739; G06F 18/26; G06F 2203/04806; G06F 3/0481; G06F 3/04845; G06F 3/0485; G06F 40/211; G06F 40/30; G06F 16/23; G06F 16/95; G06F 16/951; G06F 18/214; G06F 18/23213; G06F 18/24323; G06F 21/32; G06F 21/6227; G06F 3/1423; G06F 40/194; G06F 40/295; G06F 40/58; G06F 9/44505

See application file for complete search history.

INTELLIGENT AUTHORING FOR VIRTUAL REALITY

CROSS-REFERENCES TO RELATED APPLICATIONS

This application is a continuation of U.S. patent application Ser. No. 17/957,799, filed on Sep. 30, 2022, entitled "Intelligent Authoring for Virtual Reality," which claims priority from and is a nonprovisional application of U.S. Provisional Application No. 63/252,037, entitled "INTELLIGENT AUTHORING FOR VIRTUAL REALITY," filed on Oct. 4, 2021, the entire contents of which are herein incorporated by reference for all purposes.

BACKGROUND

While VR training materials allow for flexible training schedules and useful analytics, developing training material can be difficult to scale because the development process can be labor intensive and can involve several specialized groups. In addition to possible delays caused by coordination between groups in the development process, delays also may be caused by the client. Accordingly, it is desirable to develop a training material development tool where content can be generated quickly with direct client input.

BRIEF SUMMARY

Techniques are provided for creating training materials that allow for instruction in a virtual environment. The virtual environment can be experienced through a head-mounted display where users see and interact with virtual objects. A computer system can present a series of questions to a client and the client's responses can be used to develop a training plan. The computer system can use the training plan to generate a virtual environment that achieves the client's learning objectives.

In one embodiment, a plurality of question strings are retrieved from a question field in an interview table stored in a computer system's memory. For each question string, the question string is sent to a client computer and, in response, an answer string is received from the client computer. The answer string is stored in an answer field in a training plan table stored in the computer system's memory. The question string and answer string can be used to determine whether to add a skill framework, from a first skill framework field of the interview table, to a second skill framework field of the training plan table. A comparison between the second skill framework filed and a third skill framework field in a framework table can be used to add interactive frameworks from a first interactive framework field of a framework table to a second interactive framework field of the training plan table. A set of positional information can be retrieved from a first position field in the framework table. A set of timing information can be retrieved from a first timing field in the framework table. The positional and timing information can be retrieved based on a comparison of the second skill framework field and the third skill framework field. The positional information can be added to a second position field in the training plan table and the timing information can be added to a second timing field in the training plan table. Visual content for display in a virtual environment using a head-mounted display can be received. The virtual environment can be generated by inserting the one or more interactive frameworks, from the second interactive framework field, into the visual content based on the second position field and the second timing field.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

DETAILED DESCRIPTION

I. Overview

Embodiments of the present disclosure provide techniques for using a computer system to generate virtual reality (VR) training material (e.g., virtual environment). The virtual environment can created with physical footage (e.g., spherical video) or the virtual environment can be a computer generated three dimensional space. During training, the user can be immersed in real situations that would be difficult or expensive to replicate in a real world training (e.g., a fire in a busy store). Trainees (e.g., learners) can view and interact with the training materials through a head-mounted display (HMD). VR training materials allow for flexible training schedules. Rather than having to coordinate group trainings based on the availability of a trainer, an individual employee can be trained as needed using a HMD. VR training materials also allow for analytics about trainee performance that would be difficult to capture with traditional training methods. A HMD can track the trainee's gaze and body posture while the trainee's actions in a virtual environment can be cataloged and timed.

A. Virtual Training

Figure 1:
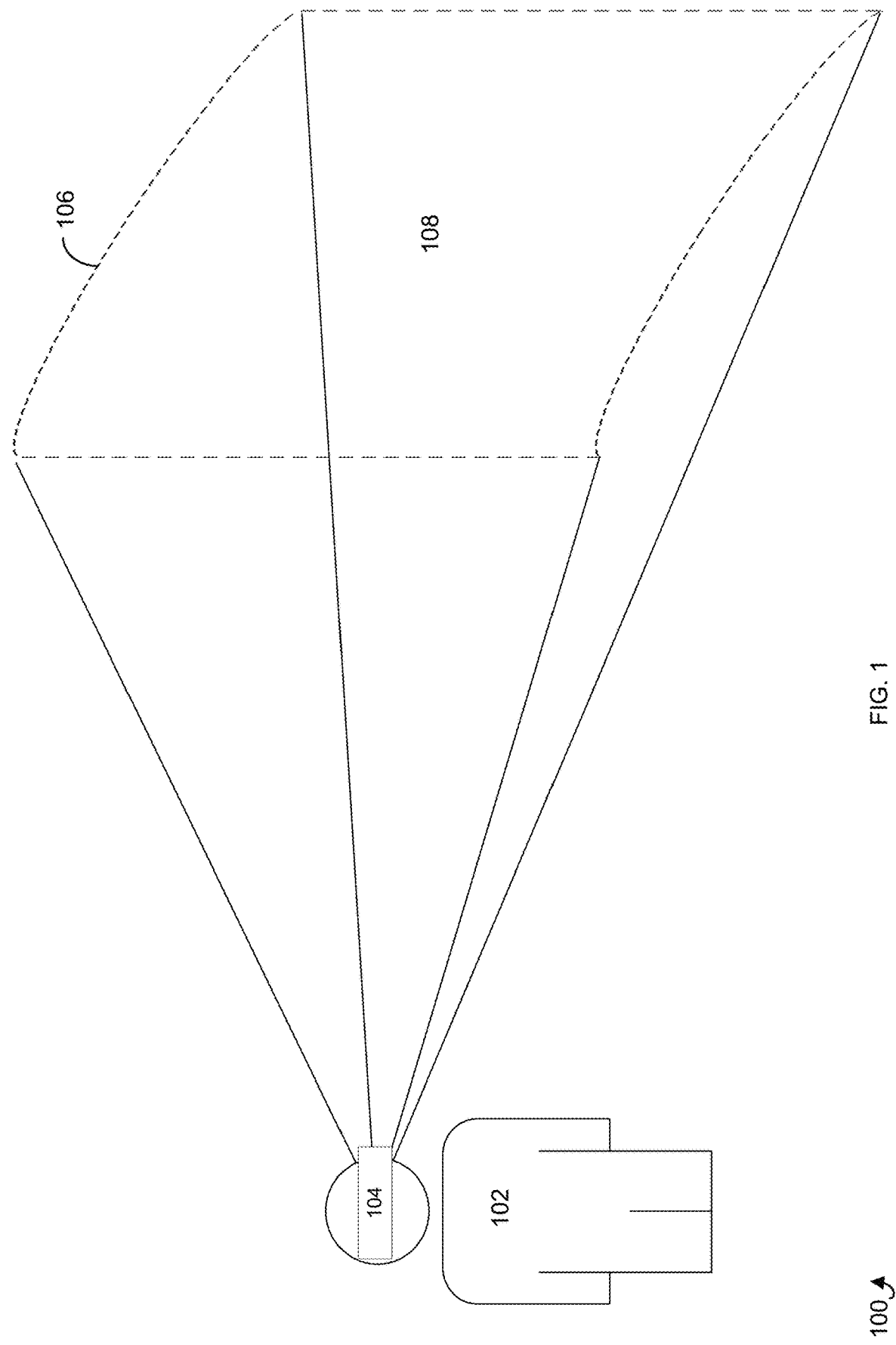
FIG. 1 shows a user viewing a virtual environment through a head-mounted display.

FIG. 1 shows a trainee 102 wearing a HMD 104. A field of vision (FOV) 106 is the portion of the virtual environment 108 that can be seen through HMD 104 at the display's current orientation. As the trainee changes the display's orientation (e.g., by moving her head), a different portion of the virtual environment is shown to the trainee 102.

Figure 2:
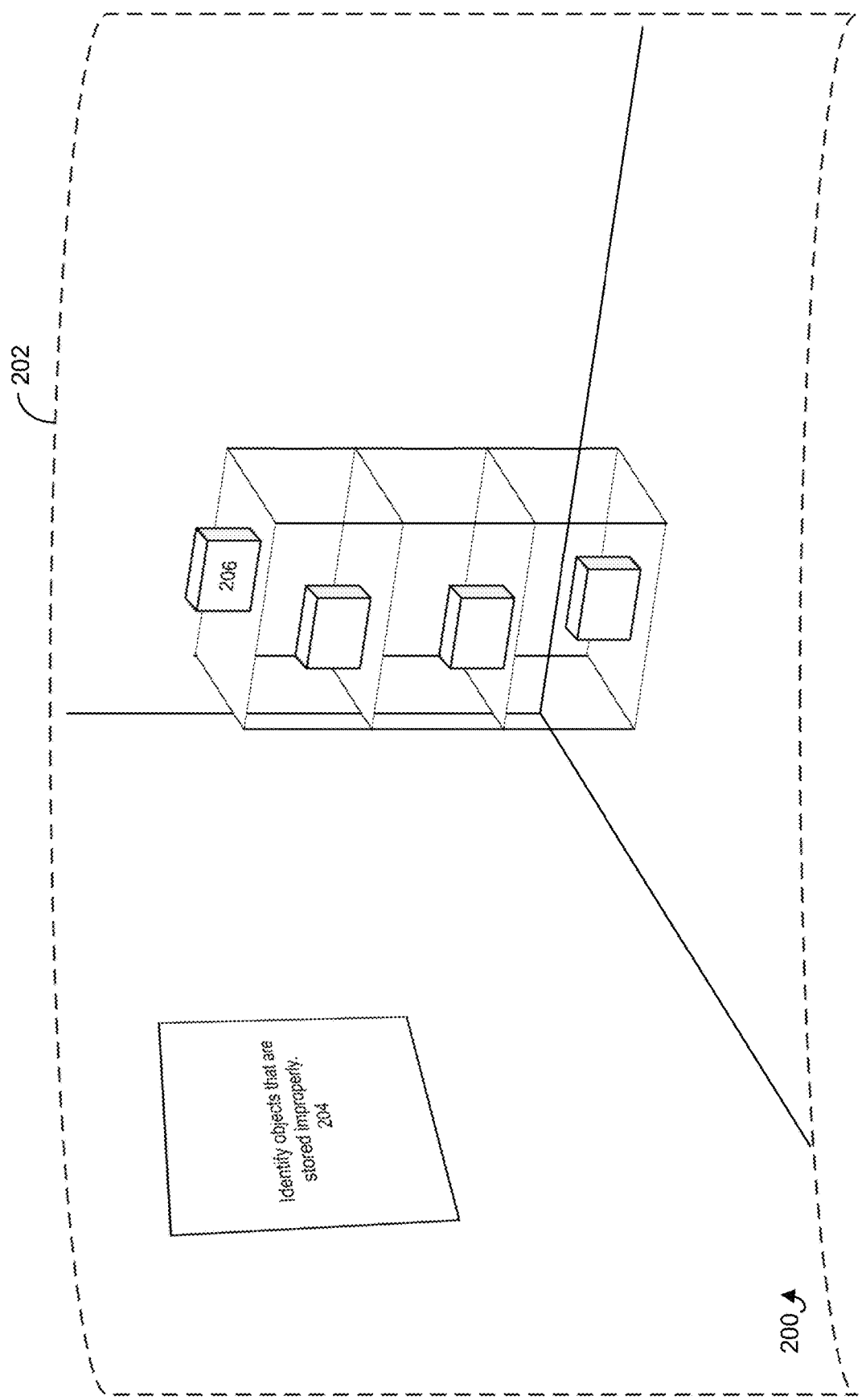
FIG. 2 shows a portion of a virtual environment viewed through a head mounted display.

FIG. 2 shows a virtual environment 200 with a FOV 202 showing the trainee's viewpoint at the HMD's current orientation. The virtual training environment 200 includes a text box 204 with instructions for a training task (e.g., a skill framework). In this case, the trainee is asked to identify items that are stored improperly. The virtual environment 200 can include an item 206 that is related to the training (e.g., an improperly stored box). The item 206 can be a representation of a physical object that was recorded on video when the visual content was generated. In other embodiments, the item 206 can be a digital object that is overlaid onto physical footage or inserted into a computer generated environment. During the training, the trainee can be prompted to select one of the items as part of a skill framework. The trainee can select the item using a controller (e.g., by pointing and clicking) or through sensors on the HMD (e.g., hand tracking). In addition to evaluating the trainee based on the trainee's selection, analytics can be recorded and used to assess the trainee's performance. Prior to the trainee's selection, the user can unconsciously interact with the item 206 in ways that are observable in a virtual environment. For instance, a HMD can record if a trainee looks at the item 206 prior to making a selection. A high performing trainee might make a selection the first time the user sees the correct item 206. In contrast, an unsure user may glance at an item several times or stare at the correct item 206 before making a selection.

Figure 3:
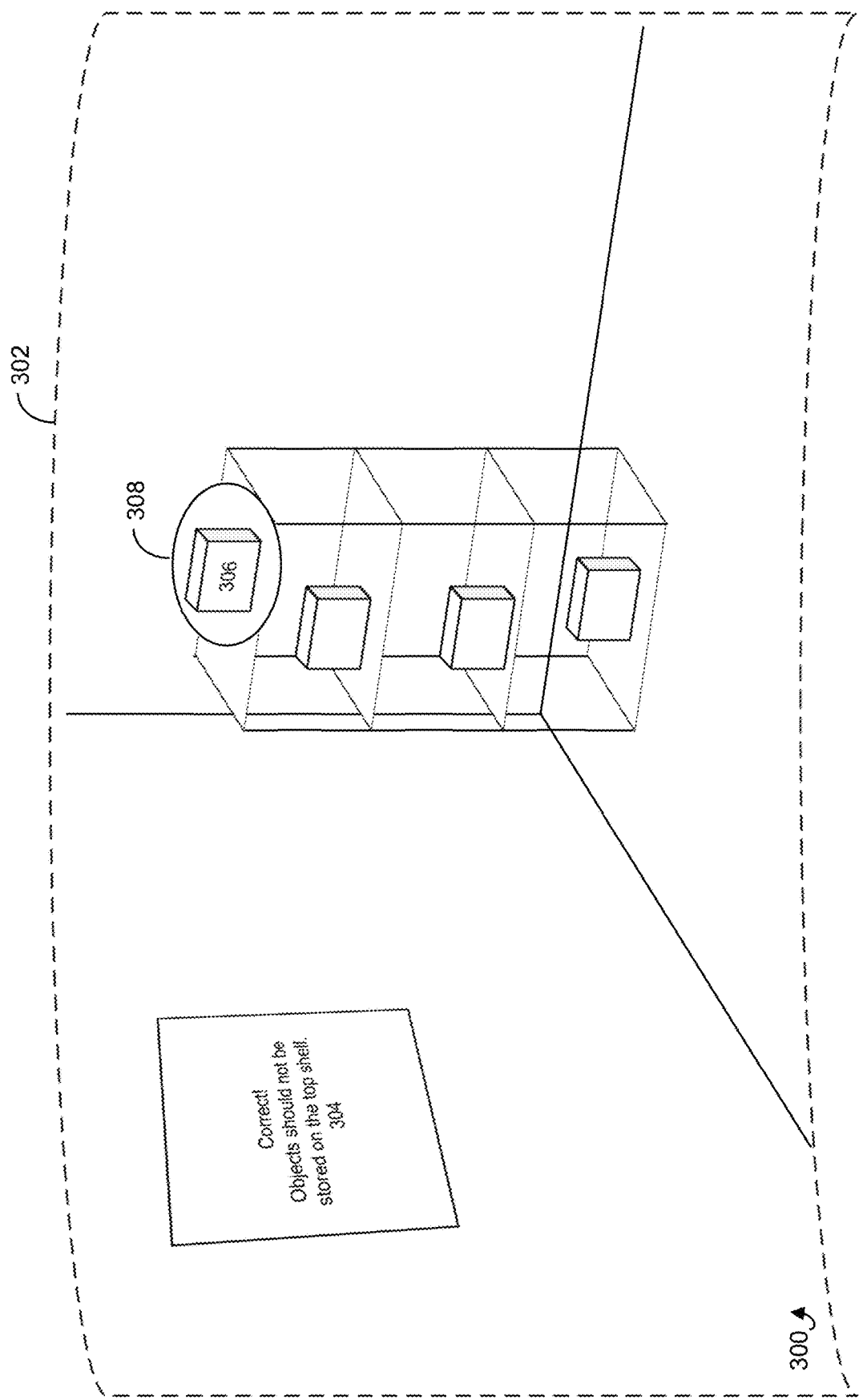
FIG. 3 is a depiction of a virtual environment viewed through a head-mounted display.

FIG. 3 shows a virtual environment 300 with a FOV 302. The text box 304 indicates that the trainee has successfully completed the task (e.g., selected the improperly stored item). The text box 304 can be used to verify that the trainee's selection was an informed decision and not random chance. For instance, the text box 304 can be used to present follow up questions to the trainee. In some implementation, feedback can be provided by recorded or live audio. The trainee's selection of the item 306 is indicated by a marker 308. The marker 308 gives the trainee immediate feedback on their performance.

Figure 4:
FIG. 4 shows a virtual environment with an interactive framework according to embodiments of the present disclosure.

FIG. 4 is an example of a virtual environment 400 showing a user completing an interactive framework (e.g., a training task). In this case, the user is asked to complete a scene hunt, a type of interactive framework, by indicating if the user notices anything unusual. The text box 402 presents a question to the user (e.g., "do you notice anything unusual?") and the user is asked to make a selection in response to the question. The user is not presented with markers indicating possible choices and the user is instead allowed to select any object or area in the virtual environment. A timer 404 indicates the amount of time remaining to complete the task and a counter 406 shows the number of remaining objects/areas left unidentified in the scene hunt. The user has made a selection with a pointer 408, which may be selectable using a hand-held device that allows control of pointer 408. The selection is indicated with a marker 410 and a feedback indicator 412 that shows the user that she made a correct selection.

Figure 5:
FIG. 5 shows a virtual environment with an interactive framework according to embodiments of the present disclosure.

FIG. 5 shows a virtual environment 500 with a user completing an interactive framework (e.g., a structured scene hunt). The user is prompted by a text box 502 to make a selection (e.g., "What should you do?"). In this scene hunt, the user is asked to select from three markers 504 indicating three possible choices. The user has not yet made a decision but the pointer 506 is hovering over a marker 504. In some embodiments, the amount of time the user's pointer 506 is aimed at the marker without making a decision can be used as part of the analytics on the user's performance (e.g., pointing at a marker without making a decision may show the user lacks confidence in their choice). In some circumstances, users may be presented with the scene hunt from FIG. 4 or the structured scene hunt from FIG. 5 depending on their experience level.

Figure 6:
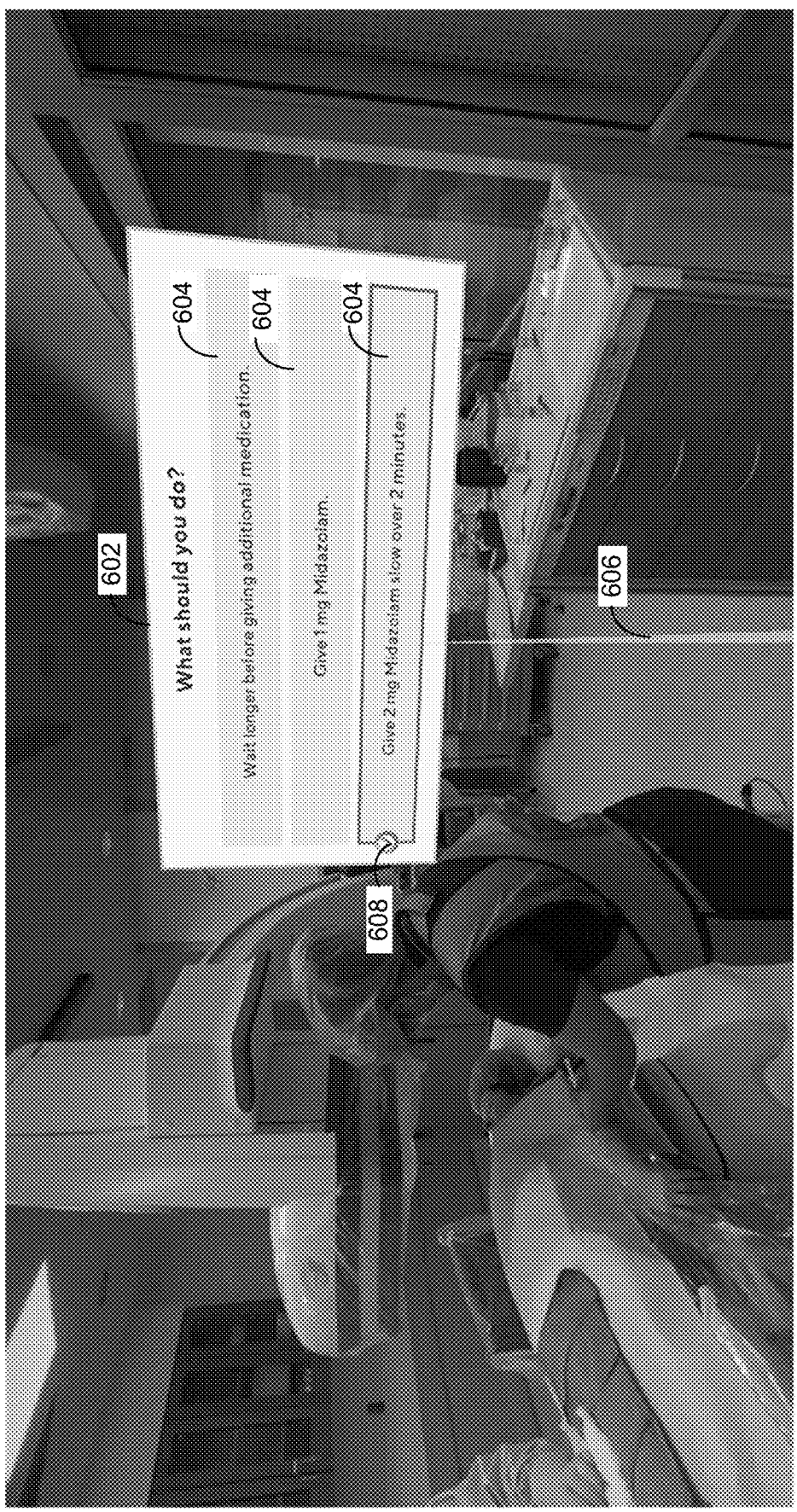
FIG. 6 shows a virtual environment with an interactive framework according to embodiments of the present disclosure.

FIG. 6 depicts a follow up question that is presented to the user based on the user's selection in FIG. 5. The text box 602 presents a question to the user with several possible answers 604. Feedback questions can be used to determine if the user's answer to the previous interactive framework (e.g., structured scene hunt from FIG. 5) was informed by her understanding of the material or if the selection was made at random. In this case, the user has made a selection, using a pointer 606, and the user's choice is indicated with a feedback indicator 608. The feedback indicator 608 can provide immediate reinforcement to the user through color (e.g., green to indicate a correct choice) or other visual cues (e.g., a check mark to show a correct choice). In some circumstance, the feedback indicator can be used to show that the user has made an incorrect choice.

B. Creating a Virtual Environment

Designing a virtual environment (e.g., VR training material) can begin with a client interview at a client computer. As part of the interview process, the client can be asked to provide one or more learning objectives (e.g., goals) for the training. The learning objective can be a sentence, written by the client, that describes the client's intended outcome from the training. The learning objective can be received as a string from a computer controlled by the client. During the interview, the client can be prompted to answer a series of questions about the learning objective(s). Asking clients for a learning objective can lead to more thoughtful interview responses because, in order to provide a learning objective, the client's attention can be focused on why the client wants to conduct a training. Once a learning objective is provided, the questions can be retrieved from an interview table by the computer system and presented to the client at the client's computer. Using the answers provided in the interview process, the computer system can determine how to implement the client's learning objective.

Based on the client's responses to questions about the learning objectives, skill frameworks can be added to a training plan table from a framework table. Skill frameworks specify the content design elements (e.g., interactive frameworks) that should be included in a training. Through the interview process, a learning objective can be "translated" into a set of skill frameworks. Once identified, the computer system can retrieve the skill frameworks from a first skill framework field in the interview table and store the skill frameworks in a second field in the training plan table. The client's learning objective can be achieved by improving a trainee's performance at the skill frameworks associated with that objective.

Interactive frameworks from the framework table can be added to the training plan table based on the skill frameworks in the training plan table. The computer system can retrieve the interactive frameworks from a first interactive framework field in the framework table and add the interactive frameworks to a second interactive framework field in the training plan. Interactive frameworks are digital objects that a trainee can interact with using the HMD. The interactive frameworks can be associated with one or more skill frameworks and the interactive frameworks can include tasks that improve a trainee's performance at one or more skill frameworks. The framework table can include timing information and positional information for the interactive frameworks. The computer system can use the timing information to determine when interactive frameworks can be inserted into visual content. Timing information can be retrieved from a first timing field in the framework table and added to a second timing field in the training plan table. Positional information can be used to determine where to insert the interactive frameworks into the visual content, e.g., a two-dimensional or three-dimensional coordinates or range of coordinates.

Once the training plan is finalized, visual content can generated, obtained from the client, or retrieved from a visual content database. Visual content can be video footage (e.g., spherical video) or a virtual environment (e.g., computer generated (CG) environment) where interactive frameworks are added to create the virtual environment (e.g., training material). The interactive frameworks from the training plan table can be added to the visual content by the computer system or the client can add the interactive frameworks by dragging and dropping the interactive frameworks into the visual content using the client computer. Once the interactive frameworks are inserted in the visual content, the visual content can be finalized and used to instruct trainees.

II. Intelligent Authoring Simplified Flowchart

Figure 7:
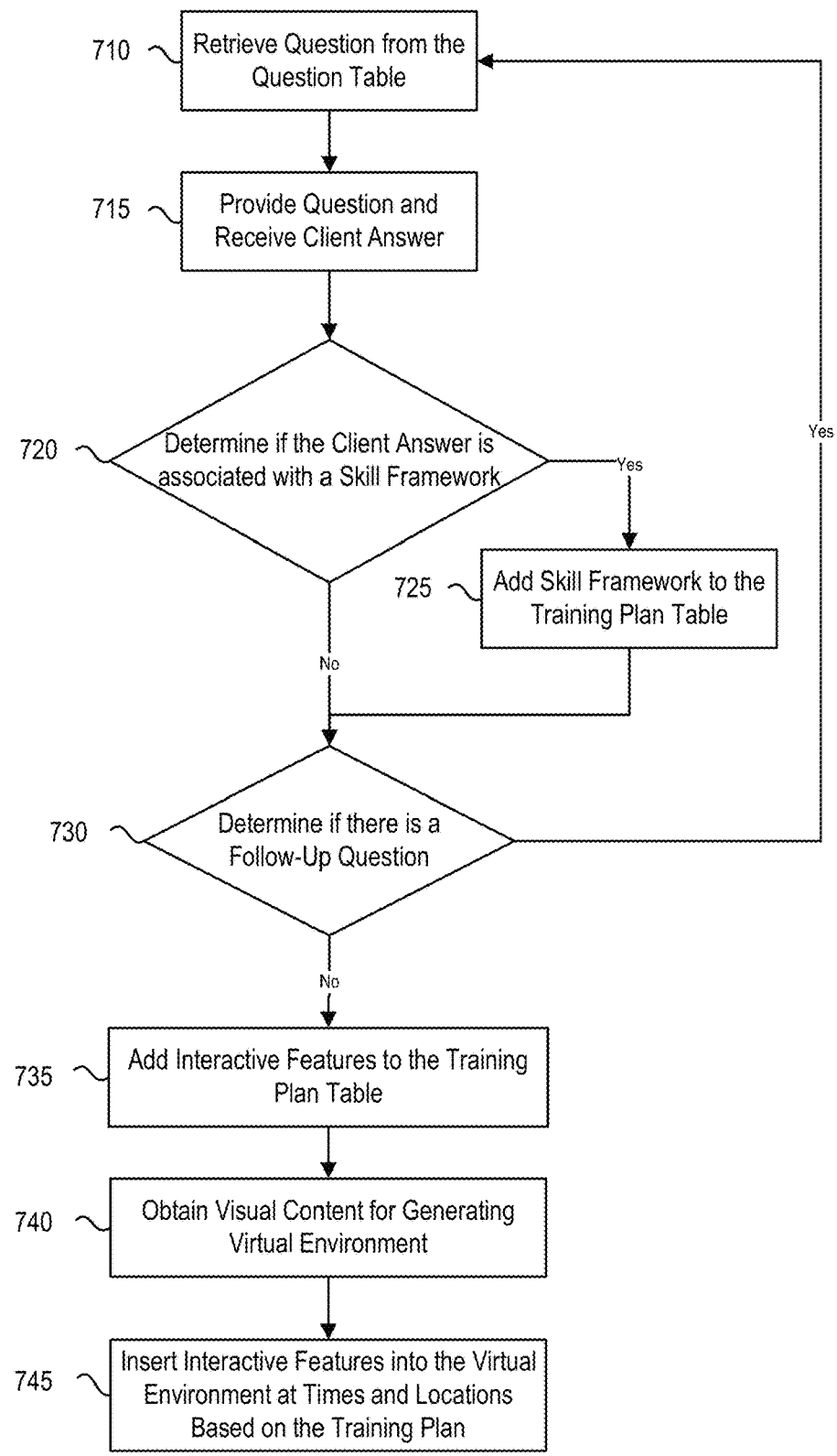
FIG. 7 is a simplified flow chart of a method for generating a virtual environment according to embodiments of the present disclosure.

FIG. 7 is a simplified flowchart of an example process 700 for generating VR training materials (e.g., a virtual environment) according to embodiments of the present disclosure. Process 700 can be used to create training materials from existing visual content (e.g., spherical videos or CG videos) or process 700 can include creating new visual content. One or more blocks of process 700 may be optional. In some examples, the trainee can wear a HMD for presenting a VR model, such as a spherical video. In some examples, a portion of the spherical video viewed by the trainee can provided to other displays to be viewed by other users (e.g., a second screen). Process 700 may be performed by a computer system, which may take carious forms, e.g., a server computer, a laptop computer, a mobile device, etc.

At block 710, a set of questions is retrieved from the question table. The questions are designed to uncover the skill frameworks associated with the user's learning objective. A learning objective is a client goal for the training and a single training can have one or more learning objectives. The questions can be a standard set of questions that are presented to a client in the same order.

At block 715, the questions and possible answers are presented to the client and an answer is received from the client. The answers can include "yes," "no," and "not sure" and the client's answer can lead to a follow up question or an end to the interview.

At block 720, the computer system determines if the question and the client's answer are associated with a skill framework. Skill frameworks can include visual object recognition, spatial awareness, applied decision making, object translocation, object manipulation, and spatial navigation.

At block 725, if the question and answer are associated with a skill framework (e.g., visual object recognition), the framework is retrieved from the interview table's skill framework field and added to a second skill framework field in a training plan table.

At block 730, the computer system determines, based on the interview table's question field and answer field, whether the question and answer are associated with a follow-up question.

At block 735, interactive frameworks are retrieved from a framework table and added to the training plan table using the training plan table's framework field. Interactive frameworks can include clickable objects, clickable locations, clickable areas, correct manipulation tasks, marker locations, branching tasks, and question follow-on tasks.

At block 740, visual content for generating a virtual environment is obtained. Visual content can be obtained from the client, preexisting content retrieved from a visual content database, or newly created content. Visual content can include spherical videos or CG environments.

At block 745, the interactive frameworks are retrieved from the training plan table and inserted into the visual content to produce the virtual environment. The interactive frameworks are inserted at times and locations based on the training plan table's position and timing fields. The interactive frameworks can be inserted into the visual content by the computer system or a client can insert the interactive frameworks into the visual content based on the training plan. In some implementations, a client inserts the frameworks by dragging and dropping premade graphics into the visual content.

Process 700 may include additional implementations, such as any single implementation or any combination of implementations described below and/or in connection with one or more other processes described elsewhere herein.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

III. Intelligent Authoring System Diagram

Figure 8:
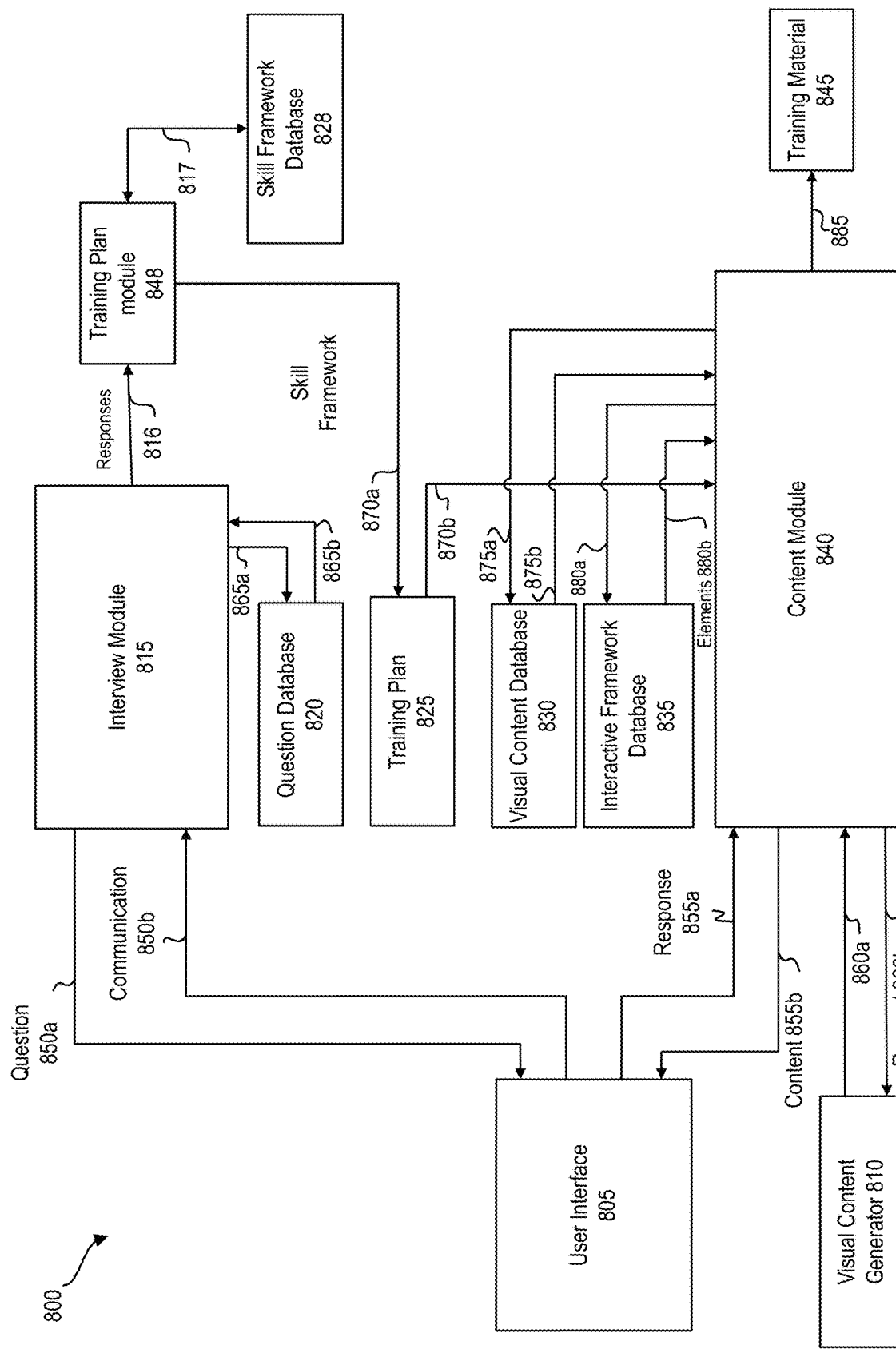
FIG. 8 is a system diagram of a method for generating a virtual environment according to embodiments of the present disclosure.

FIG. 8 is a system diagram of an example process 800 for intelligent authoring according to embodiments of the present disclosure. Process 800 involves a series of interview questions that are used to determine a set of skill frameworks associated with the client's training goals (e.g., learning objectives). As the skill frameworks are determined, a training plan is used to create training materials. Process 800 may be performed by a computer system, which may take various forms, e.g., a server computer, a laptop computer, a mobile device, etc.

A. Question Module

An interview module 815 can receive a communication requesting an interview from a user interface 805 (e.g., a computer that a user is controlling to create an environment). However, other commands or communications can trigger the interview. In response to the communication (at 865a), interview module 815 requests, from a question database 820, a question (e.g., question string) and one or more possible responses for that question (e.g., answer string). The question string can be part of the interview table's question field where the interview table's question field can be stored in the question database 820. For the answer strings, the interview module 815 can also request a follow-up address that indicates the location of a question string in the question database 820. Interview module 815 can also request an address for a skill framework in the skill framework database 828 where the skill framework is associated with the one or more of the answer strings. In some embodiments, addresses can be any identifier that indicates the location of an entry in a database. The computer system can also request interactive addresses for interactive frameworks in the interactive framework database 835.

At 865*b*, the question is received by interview module 815, and the interview module 815 presents the question (at 850*a*) to the user interface 805 and receives a communication with the response (at 850*b*). The responses can include "yes," "no," or "not sure" and the responses can be sent (at 816) from interview module 815 to training plan module 848. The response can be stored by the training plan module 848 in the training plan table's answer field and the training plan table can be part of the training plan 825. Based on the response, the interview module 815 can retrieve a follow up question identified by the question address or end the interview if there is no follow up question (e.g., as determined by whether there is a follow-up address). The follow up question can be retrieved from the question field in the interview table. After or during the interview, the skill addresses and interactive addresses can be provided to a training plan module 848. Training plan module 848 can use the skill address to retrieve skill frameworks (at 817) from a skill framework database 828 and the module can add the skill frameworks (at 870*a*) to the training plan 825. The skill frameworks can be retrieved from a first skill framework field in the interview table and, once retrieved, the skill frameworks can be added to a second skill framework field in the training plan table. The interview module 815 can continue to present questions (at 850*a*) to the user interface 805 until, based on the client's response, the question module 815 terminates the interview. In some embodiments, the interview can be terminated because the client has answered the available questions. Once the interview is terminated, the training plan module 848 can (at 870*b*) forward the training plan 825 to the content module 840.

B. Content Module

The training plan 825 can include a set of skill frameworks and a set of skill addresses obtained according to the steps discussed in section III.A. At 870*b*, content module 840 can receive training plan 825, and the content module 840 can request (at 880*a*) interactive features from the interactive framework database 835. The request can include the set of interactive addresses from the training plan 825. The requested features are associated with the skill frameworks in training plan 825 and are interactive graphics that are designed to teach and test one or more skill frameworks. The requested interactive frameworks can be determined by comparing the second skill framework field in the training plan table with a third skill framework field in the framework table. The framework table can be stored in the interactive framework database 835. Positional information and timing information associated with the requested interactive frameworks can be retrieved from the first positional field and first timing field in the framework table. The retrieved positional information and timing information can be added to a second positional field and a second timing field in the training plan table.

In response to receiving the training plan 825, the content module 840 requests (at 875*a*) visual content from the visual content database 830. As examples, visual content can include 360 degree videos and computer generated content. In various implementations, the visual content requirements could include a desired runtime, resolution, brightness, or scene dimensions/layout. In some implementations, the visual content requirements can include the positional information and timing information stored in the training plan table's position field and timing field. Compliance with the visual content requirements could be verified by a software routine or a human. The request to visual content database 830 can include one or more visual content requirements (i.e., timing information and positional information), which can be used to retrieve matching content. Each content item can be saved with fields that can be searched to identify matching content.

Any content satisfying the visual content requirements can be sent (at 875*b*) to the content module 840 and presented (at 855*b*) to the user interface 805 for approval. If the client disapproves of the content, the client can submit a response (at 855*a*) that includes client provided content or a request for newly generated content. If the client submits their own content, the content module 840 can compare the client's visual content to the visual content requirements and provides (at 855*b*) to the user interface 805 a notification indicating whether the content is acceptable or unacceptable. In some implementations, comparing computer generated visual content to the visual content requirements can include asset tagging. A list of assets can be identified and tagged in the visual content and the list can be compared to an idealized list of assets. The idealized list of assets can include assets that should be included in the visual content or assets that should be excluded from the visual content. The idealized list of assets can be determined based on one or more lists of assets from content that was previously provided by clients. In some implementations, assets can be identified and tagged in a 360 video using computer vision.

If there is no acceptable content, or the client requests new content via the user interface 805, the content module 840 sends a request (at 860*b*), including the visual content requirements, to the visual content generator 810. The visual content generator 810 can be a third party vendor or a software routine. Based on the visual content requirements the visual content generator can film or generate visual content and send (at 860*a*) the completed content to the content module 840.

After the elements are sent to the content module at 880*b*, the content module 840 can automatically insert the elements into the visual content. In other embodiments, the elements and visual content are presented (at 855*b*) to the client via user interface 805 who inserts the elements into the visual content and returns (at 855*a*) the content to the content module 840. Once the client approves of the visual content with inserted elements, the content module 840 outputs (at 885) the content as finished training material 845.

In some implementations, a list of elements are presented (at 855*b*) to the client via user interface 805 so that the client can drag and drop elements into the scene. Inserting elements into the visual content can be governed by constraints that limit where elements can be inserted into the visual content. For example, the constraints can include restricting the placement of elements so that two elements cannot occupy the same space. In some implementations, the constraints can include limiting the placement of objects within the environment based on the type of object being placed. For example, a constraint for a chair may be that the chair should be placed on a horizontal surface while a wall mounted clock can be placed on a horizontal or vertical surface. In some implementations, the constraints can vary based on the type or category of training being prepared.

In some implementations, elements can be mapped to objects already present in the environment. For example, a user can indicate that a hotspot should be inserted on objects related to fire safety. A list indicating that a hotspot will be added to a fire extinguisher, a sprinkler head, and an exit sign can be presented to the user. The user can edit the list and indicate, via a slider, a time period where the hotspots should appear in the visual content. The user can also select one or more events that can trigger the appearance of the hotspot in the visual content.

IV. Interview

Using the computer system to develop training materials can begin with an interview. While a client may not know how to design and implement a training plan, the client likely knows the training's desired outcome. An interview can begin with a client providing a learning objective (i.e., desired outcome) as an input string to the computer system. The learning objective can be a sentence written by the client that summarizes what the client would like to achieve with a training. The computer system can receive the learning objective from the client's computer, and the client can then answer a number of questions about the learning objective. Writing a learning objective can focus the client's attention on their motivation to create new training material so that the client provides thoughtful answers to the interview questions. However, in some implementations, the learning objective is not directly used by the computer systems and the same questions can be presented to the client regardless of the client's specific learning objective. Through this interrogation, the skill frameworks that can be used to achieve the client's goals can be determined and added to a training plan (e.g., training plan table). A training plan can include a set of skill frameworks associated with the client's desired learning outcome and a set of interactive frameworks selected based on the skill frameworks.

A. Learning Objectives

A learning objective can be a client's goal for the training material. The learning objectives are defined by the client and the learning objective can be different for each training material. A client can have one or more learning objectives for each training. However, a learning objective can be broken into a number of discrete skills (i.e., skill frameworks) that are relevant to successfully achieving the clients learning objective.

B. Skill Frameworks

Learning objectives can involve a number of cognitive processes (i.e., skill frameworks). For example, learning to pick up a coffee mug can involve the following processes: (1) recognizing the mug (e.g., visual object recognition) and (2) understanding how to pick up the mug (e.g., object manipulation). The skill frameworks can be transferrable across learning objectives, and, for example, improving visual object recognition for one learning objective can improve performance at other learning objectives that involve visual object recognition. After identifying the skill frameworks needed to learn a particular learning objective, the skill frameworks can be used to develop training materials that improve a trainee's performance. During the interview, the skill frameworks can be retrieved from a framework table and added to the training plan table. A non-exhaustive list of example skill frameworks is presented below.

Visual recognition is a skill framework that concerns a learner's ability to use visual information to make decisions. For example, a learner may need to categorize objects as safety hazards. The learner can use visual information about an object (e.g., color, location, size) to categorize the object as a hazard. Without this visual information, the learner wouldn't be able to properly categorize the object.

Spatial awareness is another skill framework that captures a learner's ability to know where to focus her attention in a space. Spatial awareness can be important for learning objectives that can be achieved by teaching the learner to focus on places in the environment. For example, learners may need to detect safety hazards in a warehouse. The learners may need to scan the area, paying attention to the floor, to overhead equipment, and to electrical areas. In these circumstances, spatial awareness can be important to detecting safety hazards because knowing where safety hazards are likely to exist can be critical to spotting the hazards efficiently.

Knowing how to move an object from one place to another can be taught as part of the moving objects skill framework. The moving objects skill framework can be divided into two special cases: knowing the relative positions between objects or understanding where in space objects should be located. Certain tasks, such as stacking boxes on top of each other, can be taught by improving a trainee's understanding relative positions between objects. Other tasks, such as knowing that certain objects, like a dolly, have an absolute place in the space they belong when storing them as to not create a safety hazard.

Manipulating objects is another skill framework that concerns the learner's ability to know how to interact with an object so that the object changes to a new desired state in the same spatial location. Manipulating objects can include changing the orientation/angle of an object or changing critical features on or attached to the object (e.g., flicking a switch on the object).

Navigation/pathfinding is a skill framework that describes the learner's ability to navigate or path find in a given environment. Navigation/pathfinding can be important for learning objectives that involve the learner making navigation decisions (e.g., a grocery store employee leading a customer to the store's dairy section).

C. Questions

The questions presented during the interview help determine what skill frameworks are implicated in a client's learning objective. The client can answer a series of multiple choice questions (e.g., yes, no, or I am not sure) to determine what skill frameworks are involved in their learning objective. The computer system can present the questions, as question strings, to a client controlled computer. The questions (e.g., question strings) can be the same for each interview and the questions can be presented to clients in a consistent order. The computer system can receive responses from the client as answer strings. As answers are received from the user interface, skill frameworks can be retrieved from the skill framework table in the interview table and added to the skill framework field in the training plan table based on the question responses (e.g., answer strings). For example, the skill framework visual recognition can be added to the training plan if a user answers "yes" to the question "does the learner need to make decisions based on visual information?" Once the questions are answered, the training plan can contain the skill frameworks relevant to the client's learning objective.

V. Training Plan

The training plan is the "recipe" for creating training material to achieve the client's learning objective. The training plan can be stored in the computer system's memory as a training plan table and the table can include the client's answers, skill frameworks, and interactive frameworks. During the interview process, skill frameworks are retrieved from the framework table and added to the training plan table based on the responses to the questions presented to the client. The computer system can retrieve skill frameworks from the framework table's skill framework field and add the frameworks to the training plan table based on the questions presented to the client and the client's answers. In some implementations, there is not a one-to-one correspondence between skill frameworks and interactive frameworks. In some circumstances, the interactive frameworks can be selected based on the client's experience level because, for example, some interactive frameworks may be too rudimentary for an experienced trainee while other frameworks may be too confusing for a new trainee.

In addition to the frameworks, the training plan also includes information about how to insert the interactive frameworks into the visual content. The training plan can include timing information for the interactive frameworks (e.g., values stored in the timing field). The timing information can be relative (e.g., insert framework A before framework B) or absolute (e.g., insert framework A halfway through the spherical video). The timing information can also be general (e.g., insert the framework B a short time after the trainee completes framework A) or specific (e.g., insert framework B 30 seconds after framework A). The timing information can also vary based on the trainee's experience level with, for example, frameworks inserted at shorter intervals for experienced trainees. In some implementations, the timing information can indicate that one or more frameworks should occur simultaneously or within a short time period of each other. The timing information can also include an indication that elements from one or more frameworks should be interleaved.

The training plan table can also include positional information for the interactive frameworks. The positional information (e.g., values stored in the position field) can include a suggested position for different interactive frameworks (e.g., a suggested space between objects that a trainee needs to locate). The positional information can vary based on experience level with different configurations suggested for experienced trainees. For example, objects can be located in close proximity for an experienced user, while the objects may be dispersed broadly for a novice learner. The positional information can also provide guidance so that analytics for a trainee's performance can be captured properly. For instance, analytics can be based on the trainee's gaze and interactive frameworks located in close proximity may not allow for analytics about which interactive framework the trainee is looking at.

VI. Virtual Environment Creation

Once a training plan has been developed, the training plan table can be used to create a virtual environment. The virtual environment can be created by inserting interactive frameworks into visual content.

A. Visual Content

The visual content can be the visual and spatial environment where the training occurs. The visual content can be configured for display using a HMD.

1. Spherical Video

A spherical video is a 360 degree video in which footage for multiple viewpoints is recorded simultaneously. The spherical video can be captured using an array of cameras or a specialized camera with multiple lenses. Generally, only a portion of a spherical video is shown to a user at a time. Spherical videos can be viewed through a HMD with the video panning based on the user's orientation. A user can view different portions of the video by changing the orientation of their head (e.g., looking around). A user can also view a spherical video on a conventional display device (e.g., computer monitor or television) with the user panning around the video through inputs to the device (e.g., by clicking and dragging with a mouse) or by showing multiple viewpoints on the device simultaneously (e.g., equirectangular projection). A virtual environment made from spherical videos can include multiple perspectives where each perspective is a separate spherical video. A user can navigate the virtual environment by selecting different areas that correspond to different spherical videos (i.e., perspectives).

2. Computer Generated Video

Computer generated (CG) video includes digitally generated scenes and images. CG videos allow for room-scale virtual environments that allow a user can walk around a bounded area. A user in a room-scale environment can interact with objects in the environment using natural movements. For instance, a user can walk across a room to grab an object from a shelf. A user in a room-scale CG video can also view objects from multiple angles (e.g., looking at an object while walking around the object).

3. Visual Content Database

In some implementations, visual content can be stored in a database. The visual content stored in the database can be sorted based on the content's properties. The videos can be automatically analyzed using known techniques (e.g., computer vision) to identify the visual content's properties. For instance, visual content could be sorted based on the number of persons in the content, the number of objects in the content, or the amount of movement in the content.

The visual content can also be sorted based on the visual content's past use. If the content is recycled from previous training material, the visual content can be indexed in the database based on the previous training material's learning objectives. In some implementations, the development tool can automatically search the visual content database based on the learning objective in the client's training plan. The visual content can also be indexed based on the skill frameworks or interactive frameworks previously used with the visual content. In some circumstances, the computers system can select and present visual content to the client. Alternatively, the computer system can present the client with an interface for conducting a search.

4. Visual Content Evaluation

The computer system can produce a set of visual content parameters for a given spherical video or CG environment. The parameters can be compared to a set of threshold values to determine if the visual content is appropriate for a set of skill frameworks, a set of interactive frameworks, or an intended user experience level. Additionally, the visual content parameters can be created before the visual content is stored in a visual content database and visual content, in the visual content database, can be indexed based on the set of visual content parameters.

a) Visual Content Parameters

Visual content parameters can, as examples, include motion energy analysis or object/person identification. These parameters can be used to evaluate or suggest visual content. The computer system can evaluate the visual content by comparing the measured motion energy analysis values or the number of objects or persons detected in a visual content instance (e.g., a spherical video) to a set of threshold values. For instance, the computer system can provide a warning to a client if the number of objects in the visual content exceeds an object threshold. The visual content parameters can also be used to retrieve content from a visual content database. For instance, the computer system can retrieve visual content with a motion energy analysis score that indicates sufficient activity for an experienced learner.

b) Motion Energy Analysis

Motion energy analysis (MEA) is a method for monitoring movement in a region. MEA can be used to generate a value (e.g., parameter) that indicates the amount of movement in a region. In some implementations, MEA can be used to evaluate visual content. For instance, if a client's learning objective is to train employees in how to properly close an empty store, an environment with a lot of movement may not be appropriate. In contrast, a training to prepare employees for a busy shopping day may benefit from visual content with a lot of movement. Whether the level of movement in visual content is appropriate for a given training may also depend on the intended trainee's experience level. A training designed for new hires may need a low level of movement so that the trainee is not distracted while attempting to learn a new skill. Conversely, a large amount of movement may be desirable in a refresher training for experienced workers who are expected to ignore distractions.

c) Object/Person Identification

A computer system can quantify persons or objects in visual content using known methods (e.g., computer vision, region based convolutional neural network, you only look once, etc.). The computer system can identify the total number of persons/objects in visual content, the density of persons/objects in the visual content, or an average number of persons or objects that can be viewed in a single FOV. The computer system can store one or more of these values as visual content parameters. Further details on object/person identification can be found in Kumar, A., Kaur, A. & Kumar, M. Face detection techniques: a review. Artif Intell Rev 52, 927-948 (2019). https://doi.org/10.1007/s10462-018-9650-2.

B. Interactive Frameworks

Interactive frameworks can be premade elements that can be integrated into a spherical video or a computer generated (CG) video. A client can insert the interactive frameworks into the visual content at times and places suggested by the computer system. In some implementations, the computer system can insert the interactive frameworks into the visual content. Interactive frameworks can be associated with one or more skill frameworks identified during the interview. Interactive frameworks can be organized into categories based on the type of skill frameworks associated with the interactive frameworks in the category. Interactive framework categories are discussed below.

1. Interactive Framework Categories

Navigation tasks is an interactive framework category that concerns how the learner navigates the virtual environment. At a marker location, a type of navigation task, a user is presented with several movement options. After making a selection, the user's point of view (POV) changes based on their choice. For branching, another navigation task, a user selects a POV from a list of potential viewpoints.

Selection tasks are an interactive element category that is intended to train a learner to properly select an object or location from a number of options. Clickable objects is a selection task that can include a learner selecting an object from a set of objects. Another selection task, clickable locations, can include a user selecting a location in the current environment. An example of a clickable location task could be a grocery store employee indicating where milk is located in the store. A clickable area task is a selection task that can involve a user choosing an area in their current location. For instance, a user selecting where to place an object on a shelf. Manipulation tasks can involve correctly orienting an object or part of an object. A manipulation task example could be correctly orienting a container for safe storage.

Hotspots are a type of interactive element that indicates an area of interest. Hotspots can be hidden from a learner, but the learner's interactions with the hotspot can be documented as part of the training (e.g., a user triggers a hotspot by walking to the right location). Hotspots can also be used to capture analytics on the learner's performance (e.g., counting the number of times the learner gazes at the hotspot before selecting the correct hotspot).

Scene hunts are a type of learning objective where a trainee is asked to search an area for objects or areas of interest. In a structured scene hunt, several objects or locations can be identified with markers. A question can be presented to a trainee and, in response, the trainee can select one or more of the identified objects or locations. In some embodiments, the objects or areas are not identified with a marker and a trainee can be given free choice to select any object or area. In some circumstances, a scene hunt, without markers, may be appropriate for an experienced trainee while a structured scene hunt may be appropriate for a novice trainee.

Another interactive framework category, reinforcement tasks, can occur after other frameworks and can correct behavior or help users to retain the lessons. Reinforcement tasks can include corrective feedback tasks or question follow-on tasks. Corrective feedback can include an immediate indication that the task was completed correctly or incorrectly. The indication could be auditory, visual, haptic or text based. Question follow-on tasks can determine if a selection was the result of random guessing or if the selection reflects the user's knowledge.

Interactive framework categories are not limited to the discrete tasks listed above and tasks can be combined together as needed. Such hybrid tasks include a clickable object and clickable location task which can show that a user knows what object and what location are needed to successfully complete the task.

2. Interactive Framework Insertion

Interactive frameworks can be inserted in visual content by a client. In some implementations, an individual (e.g., using the user interface) can control a computer to insert the interactive frameworks into the visual content. For example, a user can select a frame in a video or a trigger (event) for when the interactive framework would be inserted. For each learning objective, the computer system can use the training plan table to present the client with a menu containing the interactive frameworks in an order determined using the training plan. The order can specify which interactive frameworks should be placed before or after other interactive frameworks. In some implementations, the client can drag and drop interactive frameworks from the menu provided by the computer system into the visual content at times and places specified in the training plan. The menu can also include a checklist for each interactive framework to assist the client in inserting the frameworks into the visual content. The checklist can be generated using the training plan table's position field and timing field. The position information in the position field can include a range of acceptable distances between interactive frameworks and the timing information in the timing field can include a range of acceptable time periods between the end of one interactive framework and the beginning of another interactive framework. In some embodiments, the computer system can insert the interactive frameworks into the visual content using the position field and timing field.

How interactive frameworks are inserted into visual content can depend on the type of visual content. For instance, the items and people in the spherical video can be items that were physically present and recorded during filming. Accordingly, the item's characteristics (e.g., size, color, shape, or orientation) can be difficult to change after the spherical video is recorded. A trainee can interact with these recorded items using a hotspot (i.e., a type of interactive framework). A hotspot can be a set of two dimensional coordinates in a spherical video that indicate areas of interest. The two dimensional coordinates can be manually entered or a client can indicate the set of coordinates by drawing an outline around an area of interest (e.g., an outline around an improperly stored box). Such a specification of a hotspot can be used by the system to establish an interactive object that is monitored to determine if a sufficient amount of time or other measure (e.g., as measured by the coordinates of the head-mounted display) has been spent by the trainee on the hotspot. When a trainee interacts with a hotspot the interaction can be recorded as part of the training. Interactions can include a trainee looking at a hotspot, pointing at a hotspot or otherwise interacting with a hotspot (e.g., placing an object in the hotspot). In some implementations a hotspot can be a set of three dimensional coordinates.

Interactions can include pass-through analytics where the trainee's gaze crosses a hotspot and the time that the trainee's gaze is on the hotspot does not exceed a threshold. Interactions can also include fixations where the trainee's gaze intersects with a hotspot for a time period that exceeds a threshold. The focus of the trainee's gaze can be determined with a ray extending from the center of the head mounted display or through eye-tracking techniques.

VII. Intelligent Authoring System Diagram

Figure 9:
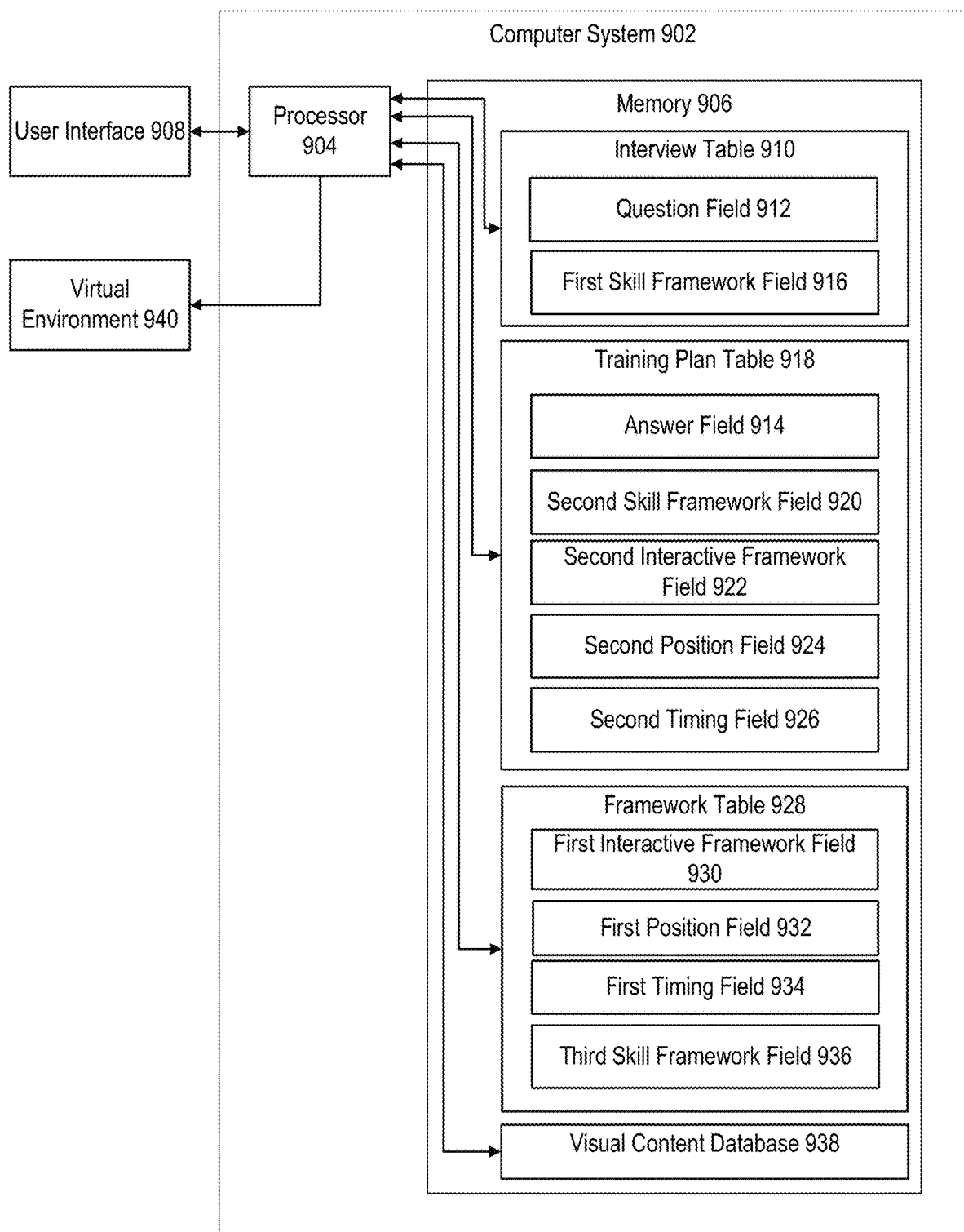
FIG. 9 is a system diagram showing part of a computer system according to embodiments of the present disclosure.

FIG. 9 is a system diagram of a computer system 900 for intelligent authoring according to embodiments of the present disclosure. Process implemented by the computer system 900 involves a series of interview questions that are used to determine skill frameworks associated with a client's learning objective. Interactive frameworks can be identified using the skill frameworks and a virtual environment (e.g., VR training material) can be produced by inserting the interactive frameworks into visual content. The user interface 908 may take various forms, e.g., a server computer, a laptop computer, a mobile device, a head mounted display (e.g., Oculus Quest 2) etc.

Intelligent authoring can be implemented by a computer system 902 with a processor 904 and a memory 906. The client can interact with the computer system through a user interface 908. The client can initiate an interview by sending a request from the user interface 908 to the computer system 902. Upon receiving the request, the processor 904 can retrieve a question string from the question field 912. The question field can be part of an interview table 910 that is stored in the memory 906. The question string can be presented to the user interface 908 and an answer string can be received from the client by the processor 904. The processor can store the answer string in the answer field 914 in a training plan table 918.

Once an answer string has been received and stored in the memory 906, the processor 904 can use the question string and answer string to identify skill frameworks in the first skill framework field 916 that are associated with the question and answer. The identified skill frameworks can be added to the second skill framework field 920 in the training plan table 918. The processor 904 can compare the second skill framework field 920 to the third skill framework field 936 in the framework table 928 to determine if interactive frameworks in the first interactive framework field 930 can be added to the second interactive framework field 922 in the training plan table 918. The interactive frameworks from first interactive framework field 930 are associated with skill frameworks in third skill framework field 936. A comparison between second skill framework field 920 and third skill framework field 936 can be used to identify the skill frameworks found in both fields. The interactive frameworks can be determined by locating first interactive framework field 930 entries that are linked to third skill framework field 936 entries containing the identified skill frameworks. The determined interactive frameworks can be moved from first interactive framework field 930 to second interactive framework field 922 in training plan table 918.

The processor 904 can also retrieve positional information from the first position field 932 and timing information from the first timing field 934 based on the comparison between the second skill framework field 920 and the third skill framework field 936. Second skill framework field 920 contains the skill frameworks that have been added to the training plan table 918. The entries in third skill framework field 936 can be associated with entries in first position field 932 and first timing field 934. A comparison between second skill framework field 920 and third skill framework field 936 can be used to identify the skill frameworks found in both fields. Positional information can be determined by locating entries in first position field 932 that are associated with entries in third skill framework field 936 containing the identified skill frameworks. A similar process can be used to determine timing information in first timing field 934. The determined timing and positional information can be retrieved from framework table 928 by processor 904. The processor can add the retrieved timing and positional information to the second position field 924 and the second timing field 926.

The processor 904 can receive visual content for display in the virtual environment using the head-mounted display. The visual content can be received by the processor 904 from the user interface 908. Visual content can also be retrieved by the processor from a visual content database 938. In some embodiments, the visual content database can be stored in the memory 906. Once the visual content has been received, the virtual environment can be generated by inserting interactive frameworks from the second interactive framework field 922 into the visual content at times and places specified by the positional information in the second position field 924 and the timing information from the second timing field 926. In some embodiments, the processor 904 can automatically insert the interactive frameworks into the visual content. Alternatively, the client can insert the interactive frameworks into the visual content by providing inputs to the user interface 908.

VIII. Method Flow

Figure 10:
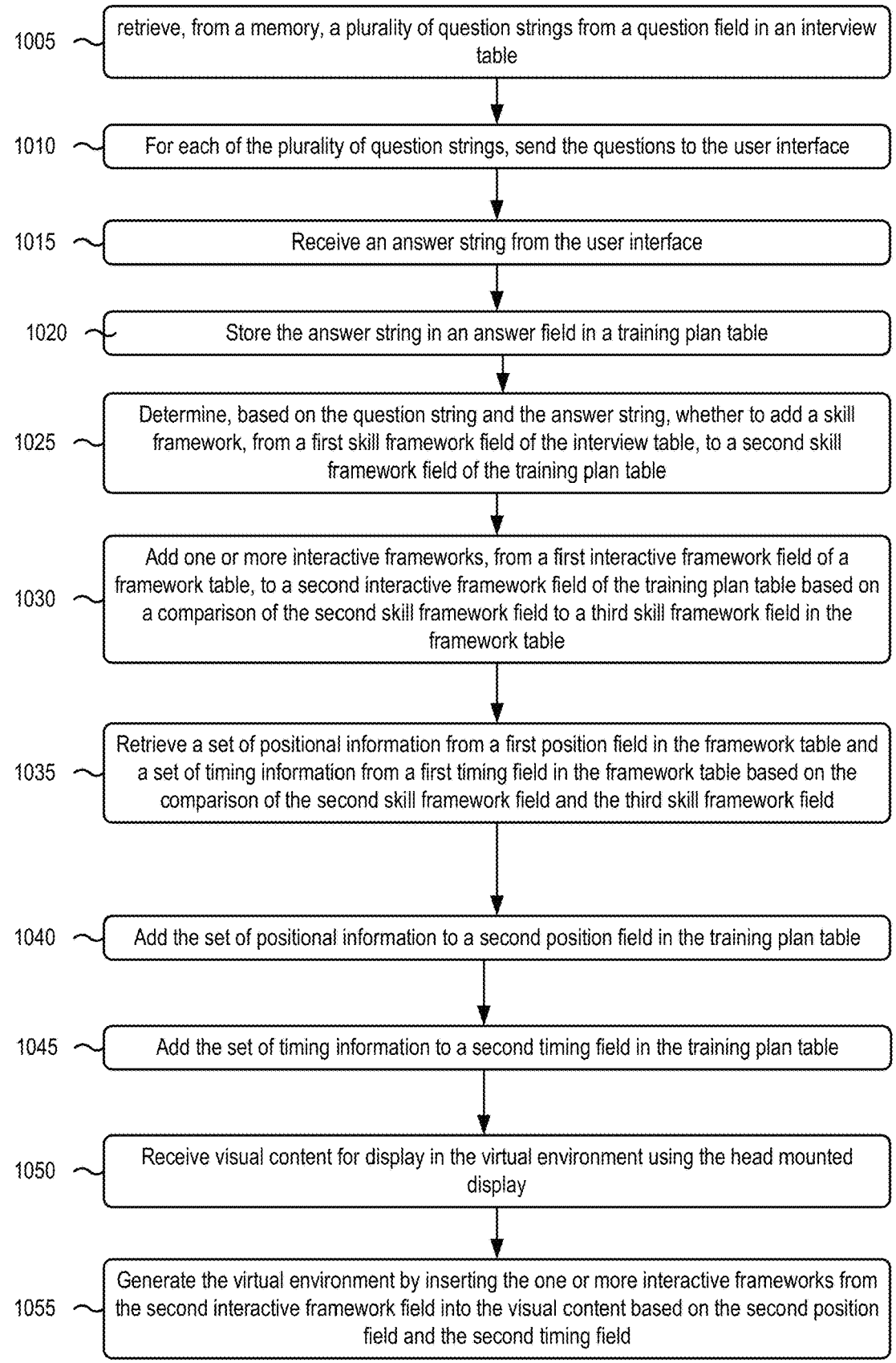
FIG. 10 illustrates a flow chart of a technique for generating a virtual environment according to embodiments of the present disclosure.

FIG. 10 is a flowchart of an example process for 1000 for generating VR training materials (e.g., a virtual environment). Process 1000 may be performed by a user interface which may take various forms, e.g., a server computer, a laptop computer, a mobile device, a head mounted display (e.g., Oculus Quest 2) etc.

At block 1005, a plurality of question strings are retrieved from a question field in an interview table stored in memory. For example, the question strings could be retrieved from the question database 820 by the interview module 815 described in section III above.

At block 1010, for each of the plurality of question strings, the questions are sent to the user interface. The question strings can be sent to the user interface 805 by the interview module 815 described in section III above.

At block 1015, an answer string is received from the user interface. An answer string can correspond to a question string that was sent to the user interface. The question string can be received from the user interface 805 by the interview module 815 as described in section III above.

At block 1020, the answer string is stored in an answer field in a training plan table. The answer string can be received from the interview module 815 and sent to the training plan 825 by the training plan module 848 described in section III above.

At block 1025, the computer system determines whether to add a skill framework, from a first skill framework field in the interview table, to a second skill framework in the training plan table based on the question string and the answer string. The training plan module 848 can add skill frameworks from the first skill framework field stored in the skill framework database 828 to the second skill framework field stored in the training plan 825 described in Section III above.

At block 1030, one or more interactive frameworks are added from a first interactive framework field of a framework table to a second interactive framework field of the training plan table based on a comparison of the second skill framework field to a third skill framework field in the framework table. The interactive frameworks can be retrieved from the interactive framework database 835 and stored in the training plan 825 by the content module 840 described in section III above.

At block 1035, a set of positional information is retrieved from a first position field in the framework table and a set of timing information is retrieved from a first timing field in the framework table based on the comparison of the second skill framework field and the third skill framework field. The content module 840 can retrieve the timing and positional information from the first timing field and the first position field stored in the interactive framework database 835 described in section III above.

At block 1040, the set of positional information is added to a second positon field in the training plan table.

At block 1045, the set of timing information is added to a second timing field in the training plan table.

At block 1050, visual content for display in the virtual environment using the head-mounted display is received. The visual content can be received from the client, or obtained from a visual content database stored in the memory. The visual content can be retrieved from the user interface 805 or the visual content generator 810 by the content module 840 described in section III above.

At block 1055, the virtual environment is generated by inserting the one or more interactive frameworks from the second interactive framework field into the visual content based on the second positon field and the second timing field. The client can insert the interactive frameworks into the visual content by dragging and dropping the frameworks using a user interface. The computer system can also insert the interactive frameworks into the visual content without client input. The interactive frameworks can be inserted by the content module 840 at times in places determined by the positional information and timing information. See section III above.

Process 1000 may include additional implementations, such as any single implementation or any combination of implementations described below and/or in connection with one or more other processes described elsewhere herein.

In some embodiments, process 1000 further includes receiving an experience level for a user from the user interface where the interactive features are determined based on the experience level.

In some embodiments, process 1000 further includes providing the virtual environment to the head-mounted display of a user.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

IX. Computer System

Figure 11:
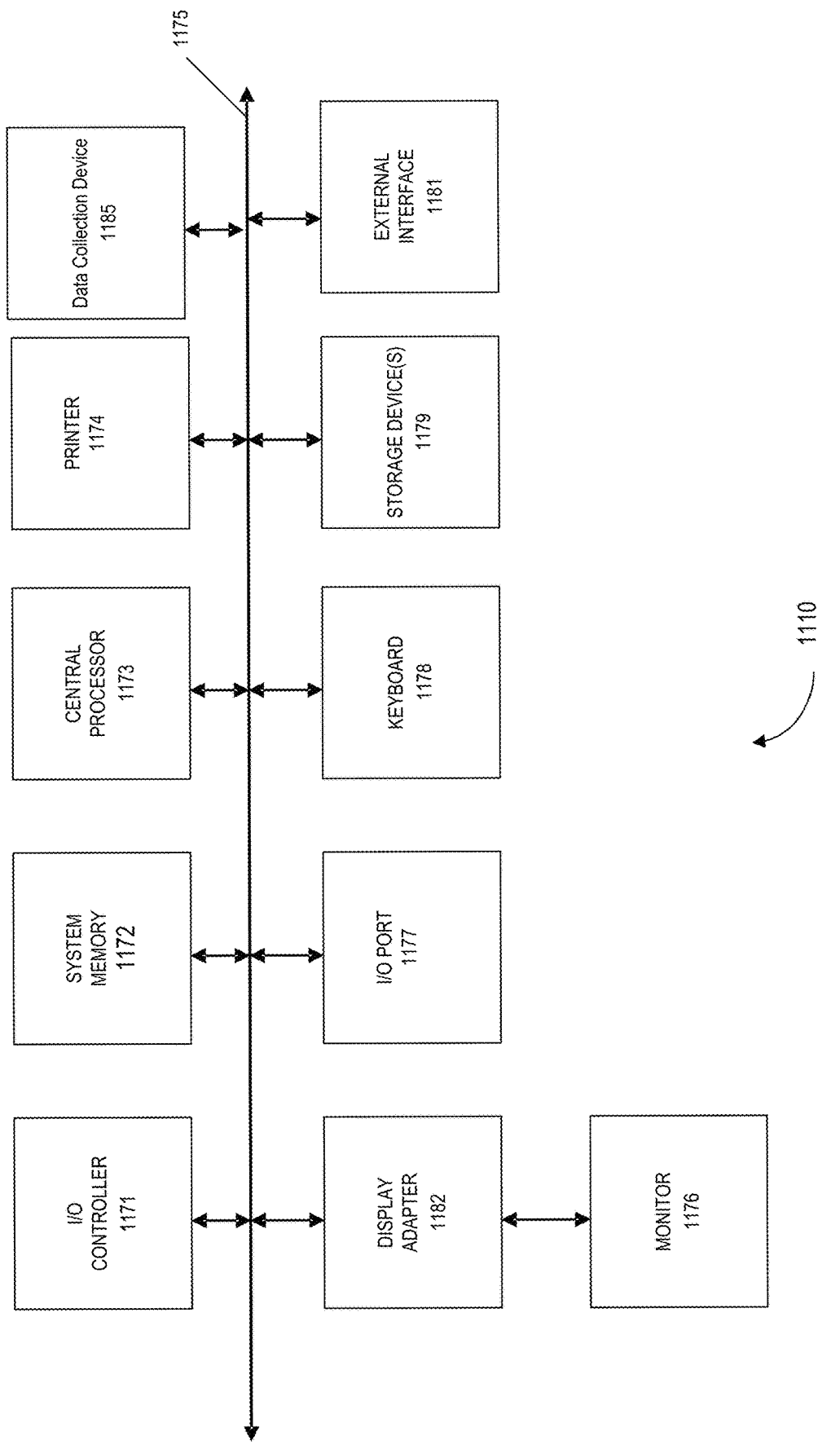
FIG. 11 shows a block diagram of a computer system according to embodiments of the present disclosure.

Any of the computer systems mentioned herein may utilize any suitable number of subsystems. Examples of such subsystems are shown in FIG. 11 in computer system 1110. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 11 are interconnected via a system bus 1175. Additional subsystems such as a printer 1174, keyboard 1178, storage device(s) 1179, monitor 1176 (e.g., a display screen, such as an LED), which is coupled to display adapter 1182, and others are shown. Peripherals and input/output (I/O) devices, which couple to I/O controller 1171, can be connected to the computer system by any number of means known in the art such as input/output (I/O) port 1177 (e.g., USB, FireWire). For example, I/O port 1177 or external interface 1181 (e.g. Ethernet, Wi-Fi, etc.) can be used to connect computer system 1110 to a wide area network such as the Internet, a mouse input device, or a scanner. The interconnection via system bus 1175 allows the central processor 1173 to communicate with each subsystem and to control the execution of a plurality of instructions from system memory 1172 or the storage device(s) 1179 (e.g., a fixed disk, such as a hard drive, or optical disk), as well as the exchange of information between subsystems. The system memory 1172 and/or the storage device(s) 1179 may embody a computer readable medium. Another subsystem is a data collection device 1185, such as a camera, microphone, accelerometer, and the like. Any of the data mentioned herein can be output from one component to another component and can be output to the user.

A computer system can include a plurality of the same components or subsystems, e.g., connected together by external interface 1181, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software stored in a memory with a generally programmable processor in a modular or integrated manner, and thus a processor can include memory storing software instructions that configure hardware circuitry, as well as an FPGA with configuration instructions or an ASIC. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method for developing a virtual environment for execution using a head-mounted display, the method comprising performing, by a computer system in communication with a user interface:
   accessing, from a memory, a training plan table comprising one or more skill frameworks in a skill framework field;
   adding one or more interactive frameworks, from a first interactive framework field of a framework table, to an interactive framework field of the training plan table based on a comparison of the skill framework field in the training plan table to another skill framework field in the framework table;
   adding a set of positional information in the framework table to a position field in the training plan table based on the skill framework field of the training plan table;
   adding a set of timing information in the framework table to a timing field in the training plan table based on the skill framework field of the training plan table;
   receiving visual content for display in the virtual environment using the head-mounted display; and
   generating the virtual environment by inserting the one or more interactive frameworks from the interactive framework field into the visual content based on the position field and the timing field.

2. The method of claim 1, further comprising:
   receiving, from the user interface, an experience level for a user, wherein the interactive frameworks are determined based on the experience level.

3. The method of claim 1, wherein the visual content is received from a visual content database stored in the memory.

4. The method of claim 3, wherein the visual content is selected from the database by the computer system based on a set of visual content parameters.

5. The method of claim 3, wherein the visual content is selected from the database based on a set of skill frameworks previously used with the visual content.

6. The method of claim 1, further comprising:
providing, by the computer system, a warning when one or more of a set of visual content parameters are above one or more of a set of threshold values.

7. The method of claim 6, wherein the set of threshold values are based on an experience level for a user.

8. The method of claim 1, wherein the interactive frameworks are inserted into the visual content by the computer system based on the position field and the timing field.

9. The method of claim 1, further comprising:
providing the virtual environment to the head-mounted display of a user.

10. The method of claim 9, wherein the interactive frameworks are updated in response to receiving, from the head-mounted display, an experience level for the user.

11. A non-transitory computer-readable medium storing a plurality of instructions that, when executed by one or more processors of a computer system in communication with a user interface, cause the one or more processors to perform operations, comprising:
accessing, from a memory, a training plan table comprising one or more skill frameworks in a skill framework field;
adding one or more interactive frameworks, from a first interactive framework field of a framework table, to an interactive framework field of the training plan table based on a comparison of the skill framework field in the training plan table to another skill framework field in the framework table;
adding a set of positional information in the framework table to a second position field in the training plan table based on the skill framework field of the training plan table;
adding a set of timing information in the framework table to a second timing field in the training plan table based on the skill framework field of the training plan table;
receiving visual content for display in a virtual environment using a head-mounted display; and
generating the virtual environment by inserting the one or more interactive frameworks from the interactive framework field into the visual content based on the position field and the timing field.

12. The medium of claim 11, further comprising:
receiving, from the user interface, an experience level for a user, wherein the interactive frameworks are determined based on the experience level.

13. The medium of claim 11, wherein the visual content is received from a visual content database stored in the memory.

14. The medium of claim 13, wherein the visual content is selected from the database by the computer system based on a set of visual content parameters.

15. The medium of claim 13, wherein the visual content is selected from the database based on a set of skill frameworks previously used with the visual content.

16. A system comprising:
a non-transitory computer-readable medium storing computer-executable program instructions; and
a processing device of a computer system communicatively coupled to the computer-readable medium for executing the computer-executable program instructions, wherein executing the computer-executable program instructions configures the processing device to perform operations comprising:
accessing, from a memory, a training plan table comprising one or more skill frameworks in a skill framework field;
adding one or more interactive frameworks, from a first interactive framework field of a framework table, to an interactive framework field of the training plan table based on a comparison of the skill framework field in the training plan table to another skill framework field in the framework table;
adding a set of positional information in the framework table to a second position field in the training plan table based on the skill framework field of the training plan table;
adding a set of timing information in the framework table to a second timing field in the training plan table based on the skill framework field of the training plan table;
receiving visual content for display in a virtual environment using a head-mounted display; and
generating the virtual environment by inserting the one or more interactive frameworks from the interactive framework field into the visual content based on the position field and the timing field.

17. The system of claim 16, further comprising:
providing, by the computer system, a warning when one or more of a set of visual content parameters are above one or more of a set of threshold values.

18. The system of claim 17, wherein the set of threshold values are based on an experience level for a user.

19. The system of claim 16, wherein the interactive frameworks are inserted into the visual content by the computer system based on the second position field and the second timing field.

20. The system of claim 16, further comprising:
providing the virtual environment to the head-mounted display of a user.

* * * * *